(12) United States Patent
Sporzynski (10) Patent No.: US 6,367,598 B1
(45) Date of Patent: Apr. 9, 2002

(54) ROTOR FOR DISC BRAKE ASSEMBLY

(75) Inventor: Robert S. Sporzynski, Chelsea, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/607,046

(22) Filed: Jun. 30, 2000

(51) Int. Cl.⁷ .............................................. F16D 65/10
(52) U.S. Cl. ......................... 188/218 XL; 188/264 AA
(58) Field of Search ...................... 188/218 XL, 264 A, 188/264 AA, 18 A, 71.6; 192/113.2, 113.21, 133.23, 113.26

(56) References Cited

U.S. PATENT DOCUMENTS

| | | | |
|---|---|---|---|
| 2,779,210 A | * | 1/1957 | Holloway |
| 3,393,775 A | * | 7/1968 | Hollins .................. 188/218 XL |
| 4,164,993 A | | 8/1979 | Kobelt |
| 4,523,666 A | * | 6/1985 | Murray .................. 188/218 XL |
| 4,811,822 A | | 3/1989 | Estaque |
| 4,825,981 A | * | 5/1989 | Otto et al. ............. 188/264 AA |
| 4,853,574 A | | 8/1989 | Estaque |
| 4,867,284 A | * | 9/1989 | Okamura et al. ...... 188/218 XL |
| 5,427,212 A | | 6/1995 | Shimazu et al. |
| 5,492,205 A | * | 2/1996 | Zhang .................... 188/218 XL |
| 5,526,905 A | * | 6/1996 | Shimazu et al. ....... 188/218 XL |
| 5,542,503 A | * | 8/1996 | Dunn et al. ................. 188/18 A |
| 5,544,726 A | | 8/1996 | Topouzian et al. |
| 5,810,123 A | | 9/1998 | Giorgetti et al. |
| 5,864,935 A | * | 2/1999 | Baumgartner et al. ...... 188/218 XL |
| 5,878,479 A | * | 3/1999 | Dickerson et al. .... 188/218 XL |
| 5,878,848 A | | 3/1999 | Zhang |
| 6,032,769 A | * | 3/2000 | Daudi ................... 188/218 XL |

FOREIGN PATENT DOCUMENTS

WO          WO 99/50109          10/1999

* cited by examiner

Primary Examiner—Douglas C. Butler
Assistant Examiner—Robert A. Siconolfi
(74) Attorney, Agent, or Firm—MacMillan, Sobanski & Todd, LLC (57) ABSTRACT

A brake rotor for use in a vehicle disc brake assembly includes an inner mounting flange and an outer annular friction disc connected together by a circumferential hat. The inner mounting flange is formed having a center pilot hole and a plurality of lug bolt receiving holes equally spaced circumferentially about the pilot hole. The outer annular friction disc includes a pair of annular friction plates which are connected together in a spaced apart relationship by a plurality of fins spaced circumferentially around the friction disc. Each successive pair of the fins defines a cooling passageway between the friction plates. Each of the fins extends in a generally radial direction and includes an innermost end, an outermost end, and a pair of spaced apart outer side wall surfaces. Each fin defines a symmetric center axis between the outermost end and the innermost end thereof. The pair of spaced apart outer side wall surfaces define smooth progressively increasing curved outer surfaces extending radially outwardly from adjacent the innermost end to adjacent the outermost end thereof.

14 Claims, 8 Drawing Sheets

ROTOR FOR DISC BRAKE ASSEMBLY

BACKGROUND OF THE INVENTION

This invention relates in general to vehicle disc brake assemblies and in particular to an improved structure for a rotor adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor bracket. The anchor bracket is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

A considerable amount of heat is generated between the rotor and the brake shoes during braking. In order for a rotor to be able to adequately absorb the heat generated during a given stop, as well as to sufficiently cool to a safe operating temperature for the next stop, it is known to form the rotor having a "vented" or "ventilated" design. A conventional ventilated rotor includes a pair of spaced apart brake friction plates which are connected together by a plurality of ribs or posts. U.S. Pat. No. 5,188,203 to Winter, U.S. Pat. No. 4,928,798 to Watson et al., U.S. Pat. No. 4,865,167 to Giorgetti et al., German No. 4,210,449, German Pat. No. 4,210,448, German Pat. No. 3,527,577, and European Pat. No. 77,433 disclose prior art ventilated brake rotors.

In a ventilated rotor, the particular shapes and spacings of the ribs or posts is important for several reasons. First, the shapes and spacings of the ribs or posts should not restrict the flow of cooling air through interior passageways defined therebetween. At the same time, the shapes and spacings of the ribs or posts should provide the rotor with sufficient strength or rigidity. This is especially important at the outer radial portion of the rotor, inasmuch as the brake pads generally apply a greater braking pressure in this region. Additionally, the shape and spacing of the ribs or posts should not add unnecessary rotating mass and unsprung weight to the vehicle, which adversely affects the performance, handling, and fuel economy of the vehicle. Thus, it would be desirable to provide an improved structure for a ventilated rotor adapted for use in a disc brake assembly which provides satisfactory heat capacity and rigidity.

SUMMARY OF THE INVENTION

This invention relates to an improved structure for a brake rotor adapted for use in a vehicle disc brake assembly. The brake rotor includes an inner mounting flange and an outer annular friction disc connected together by a circumferential hat. The inner mounting flange is formed having a center pilot hole and a plurality of lug bolt receiving holes equally spaced circumferentially about the pilot hole. The outer annular friction disc includes a pair of annular friction plates which are connected together in a spaced apart relationship by a plurality of fins spaced circumferentially around the friction disc. Each successive pair of the fins defines a cooling passageway between the friction plates. Each of the fins extends in a generally radial direction and includes an innermost end, an outermost end, and a pair of spaced apart outer side wall surfaces. Each fin defines a symmetric center axis between the outermost end and the innermost end thereof. The pair of spaced apart outer side wall surfaces define smooth progressively increasing curved outer surfaces extending radially outwardly from adjacent the innermost end to adjacent the outermost end thereof.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
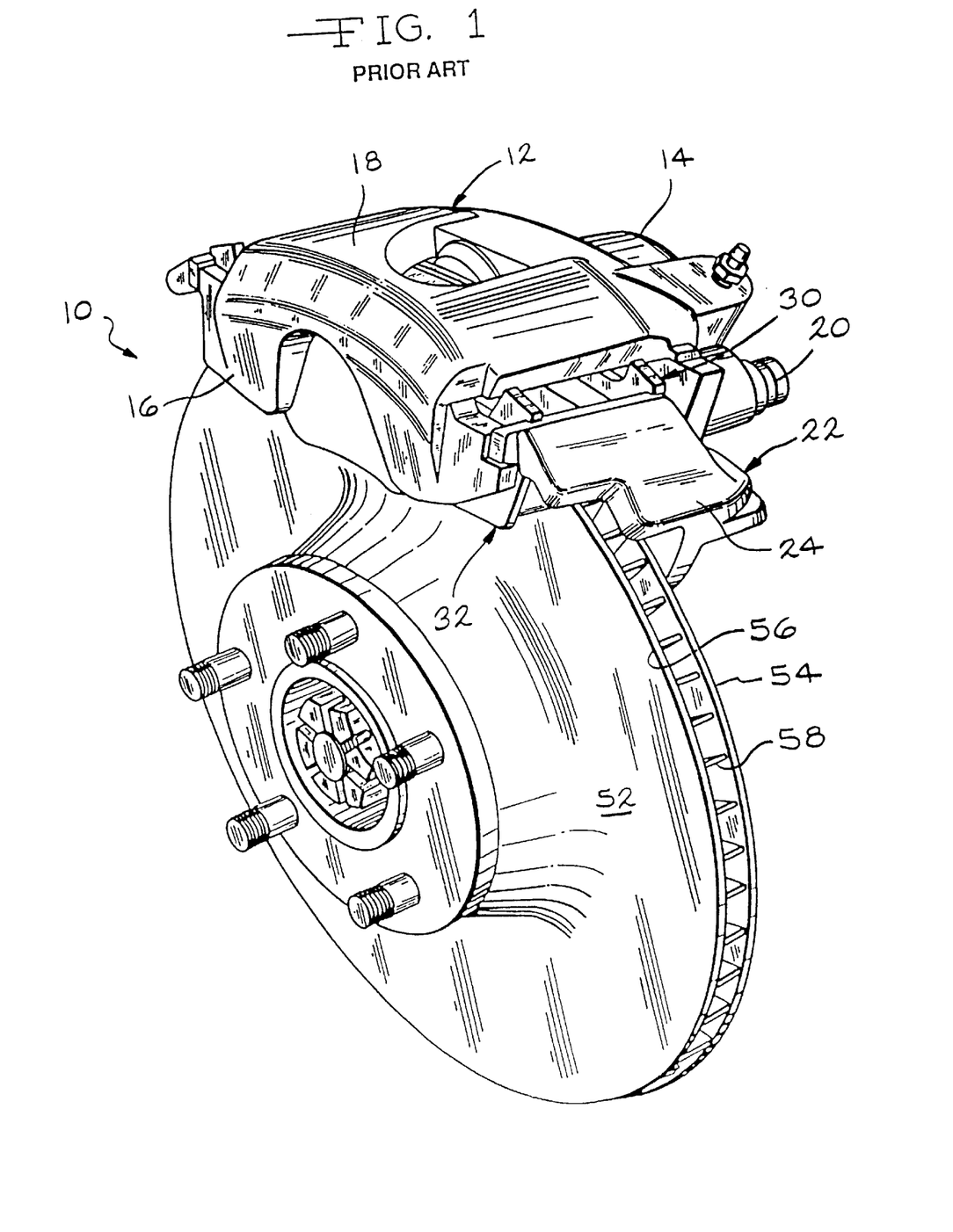
FIG. 1 is a perspective view of a portion of a prior art vehicle disc brake assembly.
Figure 2:
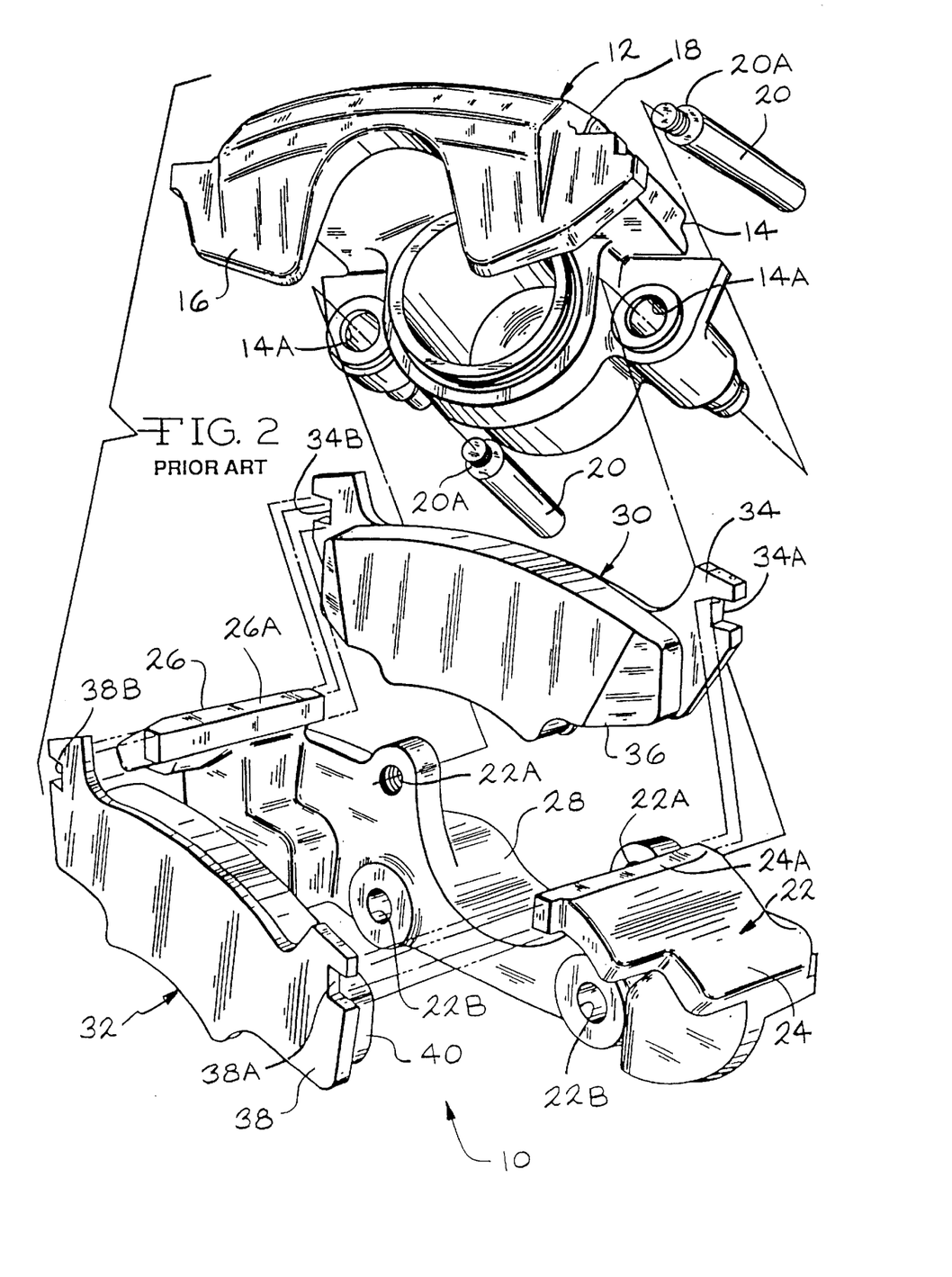
FIG. 2 is an exploded perspective view of selected components of the prior art vehicle disc brake assembly illustrated in FIG. 1.
Figure 3:
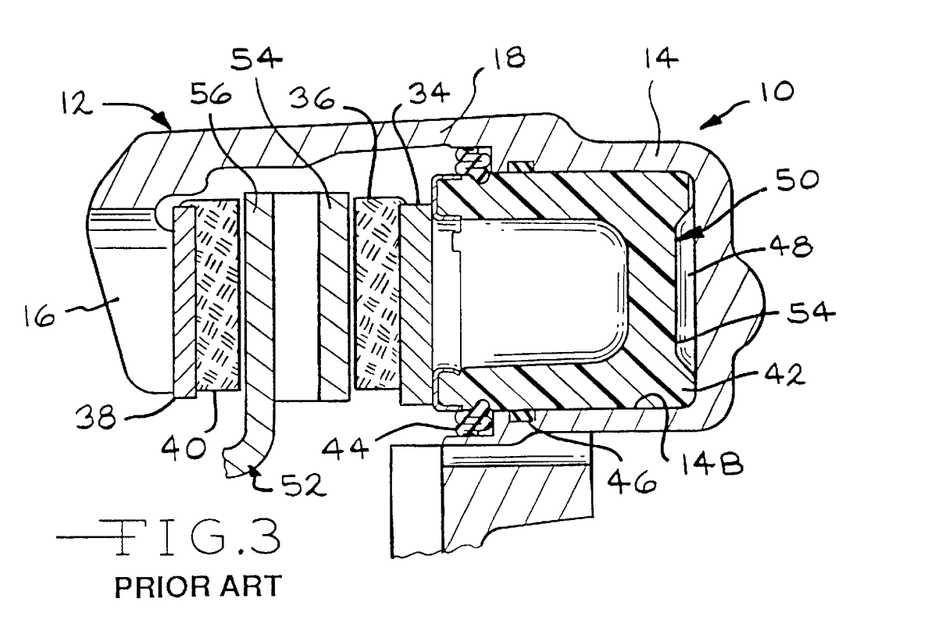
FIG. 3 is a sectional elevational view of a portion of the prior art disc brake assembly illustrated in FIG. 1.

Referring now to the drawings, there is illustrated in prior art FIGS. 1 through 3 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The prior art disc brake assembly 10 is a sliding type of disc brake assembly and includes a generally C-shaped caliper, indicated generally at 12. The caliper 12 includes an inboard leg portion 14 and an outboard leg portion 16 which are interconnected by an intermediate bridge portion 18. The caliper 12 is slidably supported on a pair of pins 20 secured to an anchor bracket, indicated generally at 22. The anchor bracket 22 is, in turn, secured to a stationary component of the vehicle. Such a stationary component can be, for example, an axle flange (not shown), when the disc brake assembly 10 is installed for use on the rear of the vehicle, or a steering knuckle (not shown), when the disc brake assembly 10 is installed for use on the front of the vehicle.

The pins 20 extend through non-threaded apertures 14A formed in the inboard leg 14 of the caliper 12. The pins 20 have respective threaded ends 20A which are received in threaded apertures 22A provided in anchor bracket 22. The pins 20 support the caliper 12 for sliding movement relative to the anchor bracket 22 in both the outboard direction (left when viewing prior art FIG. 3) and the inboard direction (right when viewing prior art FIG. 3). Such sliding movement of the caliper 12 occurs when the disc brake assembly 10 is actuated, as will be explained below. A pair of bolts (not shown) extend through a pair of non-threaded apertures 22B formed in the anchor bracket 22 to secure the anchor bracket 22 to the stationary vehicle component. Alternatively, other known securing methods can be used to secure the anchor bracket 22 to the stationary vehicle component.

As best shown in prior art FIG. 2, the anchor bracket 22 includes a pair of axially and outwardly extending arms 24 and 26 which are interconnected at their inboard ends by an inner tie bar 28. The arms 24 and 26 have upstanding guide rails 24A and 26A, respectively formed thereon. The guide rails 24A and 26A extend transverse to the arms 24 and 26, respectively, and parallel to one another. The guide rails 24A and 26A slidably support an inboard brake shoe, indicated generally at 30, and an outboard brake shoe, indicated generally at 32, respectively.

The inboard brake shoe 30 includes a backing plate 34 and a friction pad 36. The inboard backing plate 34 includes opposed ends having notches 34A and 34B formed therein, for supporting the inboard brake shoe 30 on the guide rails 24A and 26A of the anchor bracket 22. The outboard brake shoe 32 includes a backing plate 38 and a friction pad 40. The outboard backing plate 3 8 includes opposed ends having notches 38A and 38B formed therein, for supporting the outboard brake shoe 32 on the guide rails 24A and 26A of the anchor bracket 22. Alternatively, the inboard brake shoe 30 can be supported on a brake piston of the prior art disc brake assembly 10, while the outboard brake shoe 32 can be supported on the outboard leg portion 16 of the caliper 12.

An actuation means, indicated generally at 50 in prior art FIG. 3, is provided for effecting the operation of the disc brake assembly 10. The actuation means 50 includes a brake piston 42 which is disposed in a counterbore or recess 14B formed in the outboard surface of the inboard leg 14 of the caliper 12. The actuation means 50, shown in this embodiment as being a hydraulic actuation means, is operable to move the piston 42 within the recess 14B in the outboard direction (left when viewing prior art FIG. 3). However, other types of actuation means 50, such as for example, electrical, pneumatic, and mechanical types, can be used.

The prior art disc brake assembly 10 also includes a dust boot seal 44 and an annular fluid seal 46. The dust boot seal 44 is formed from a flexible material and has a first end which engages an outboard end of the recess 14B. A second end of the dust boot seal 44 engages an annular groove formed in an outer side wall of the piston 42. A plurality of flexible convolutions are provided in the dust boot seal 44 between the first and second ends thereof. The dust boot seal 44 is provided to prevent water, dirt, and other contaminants from entering into the recess 14B. The fluid seal 46 is disposed in an annular groove formed in a side wall of the recess 14B and engages the outer side wall of the piston 42. The fluid seal 46 is provided to define a sealed hydraulic actuator chamber 48, within which the piston 42 is disposed for sliding movement. Also, the fluid seal 46 is designed to function as a "roll back" seal to retract the piston 42 within the recess 14B (right when viewing prior art FIG. 3) when the brake pedal is released.

The prior art disc brake assembly 10 further includes a brake rotor 52, which is connected to a wheel (not shown) of the vehicle for rotation therewith. The illustrated brake rotor 52 includes a pair of opposed friction discs 54 and 56 which are spaced apart from one another by a plurality of intermediate fins or posts 58 in a known manner. The brake rotor 52 extends radially outwardly between the inboard friction pad 36 and the outboard friction pad 40.

When it is desired to actuate the prior art disc brake assembly 10 to retard or stop the rotation of the brake rotor 52 and the vehicle wheel associated therewith, the driver of the vehicle depresses the brake pedal (not shown). In a manner which is well known in the art, the depression of the brake pedal causes pressurized hydraulic fluid to be introduced into the chamber 48. Such pressurized hydraulic fluid urges the piston 42 in the outboard direction (toward the left when viewing prior art FIG. 3) into engagement with the backing plate 34 of the inboard brake shoe 30. As a result, the friction pad 36 of the inboard brake shoe 30 is moved into frictional engagement with the inboard friction disc 54 of the brake rotor 52. At the same time, the caliper 12 slides on the pins 20 in the inboard direction (toward the right when viewing prior art FIG. 3) such that the outboard leg 16 thereof moves the friction pad 40 of the outboard brake shoe 32 into frictional engagement with the outboard friction disc 56 of the brake rotor 52. As a result, the opposed friction discs 54 and 56 of the brake rotor 52 are frictionally engaged by the respective friction pads 36 and 40 to slow or stop relative rotational movement thereof. The structure and operation of the prior art disc brake assembly 10 thus far described is conventional in the art.

Figure 4:
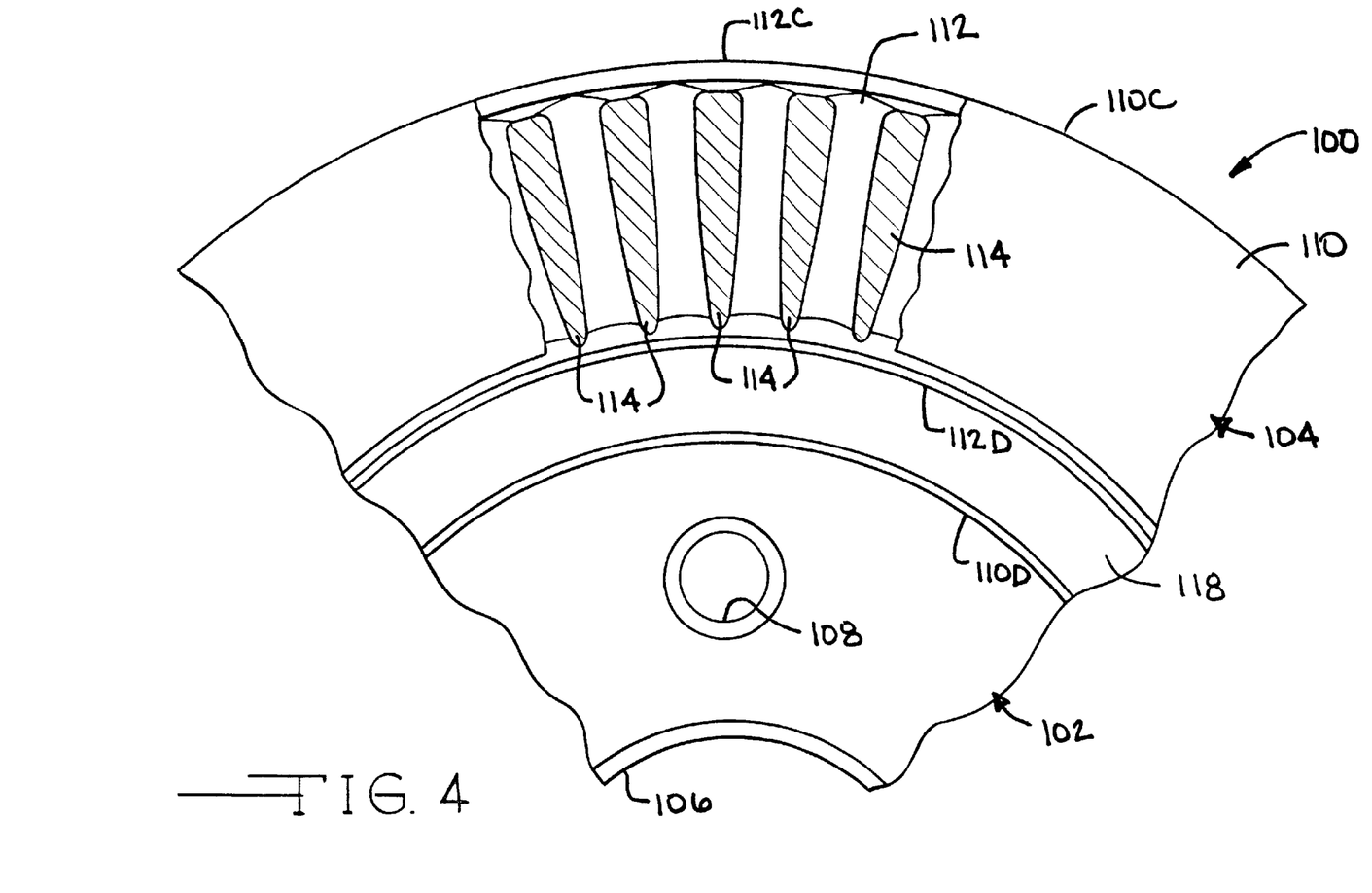
FIG. 4 is a sectional view, partially broken away, of a portion a first embodiment of an improved structure for a brake rotor adapted for use in the prior art disc brake assembly illustrated in FIGS. 1–3, in accordance with the present invention.
Figure 5:
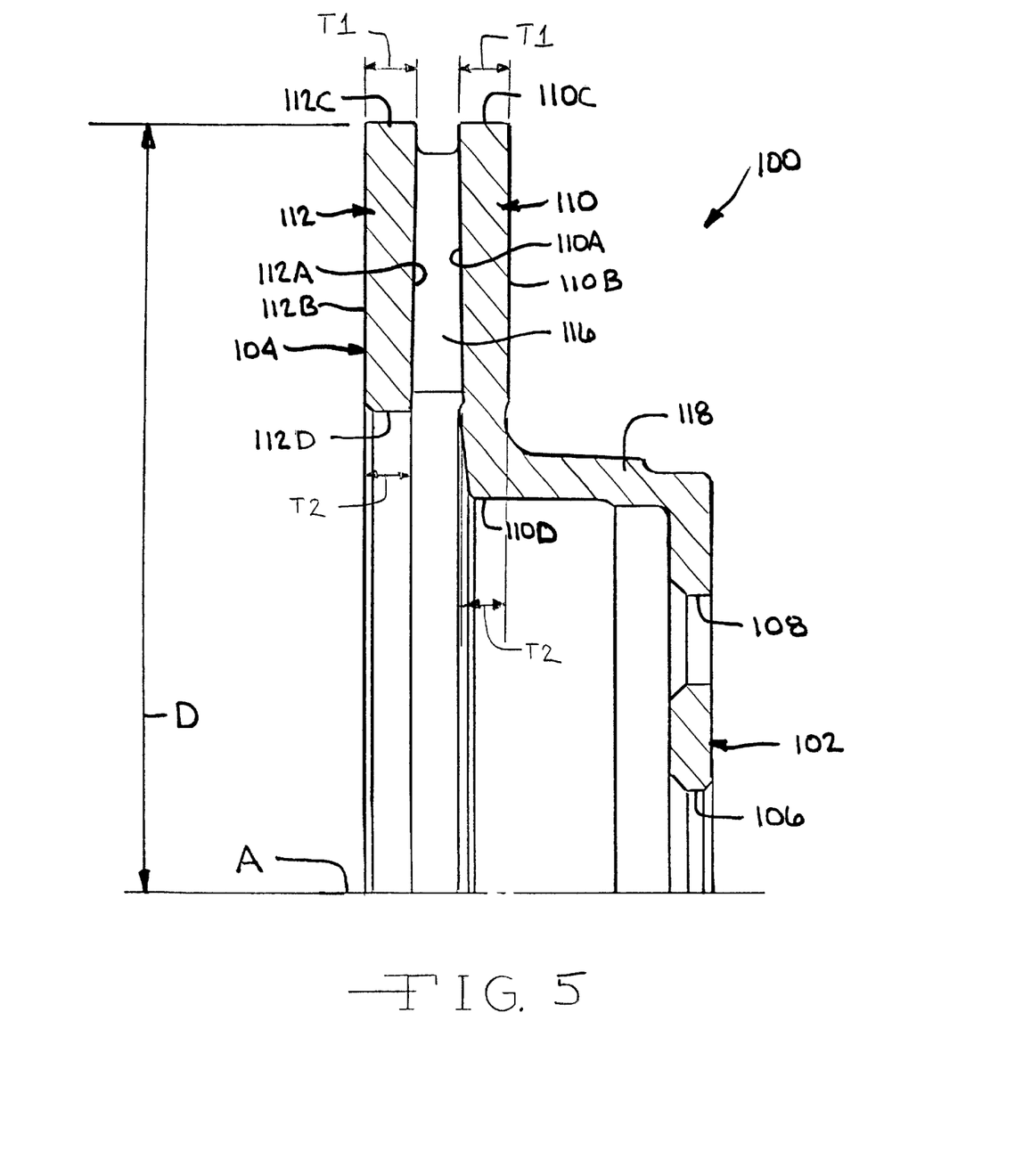
FIG. 5 is a sectional view taken along line 5—5 of FIG. 4.
Figure 6:
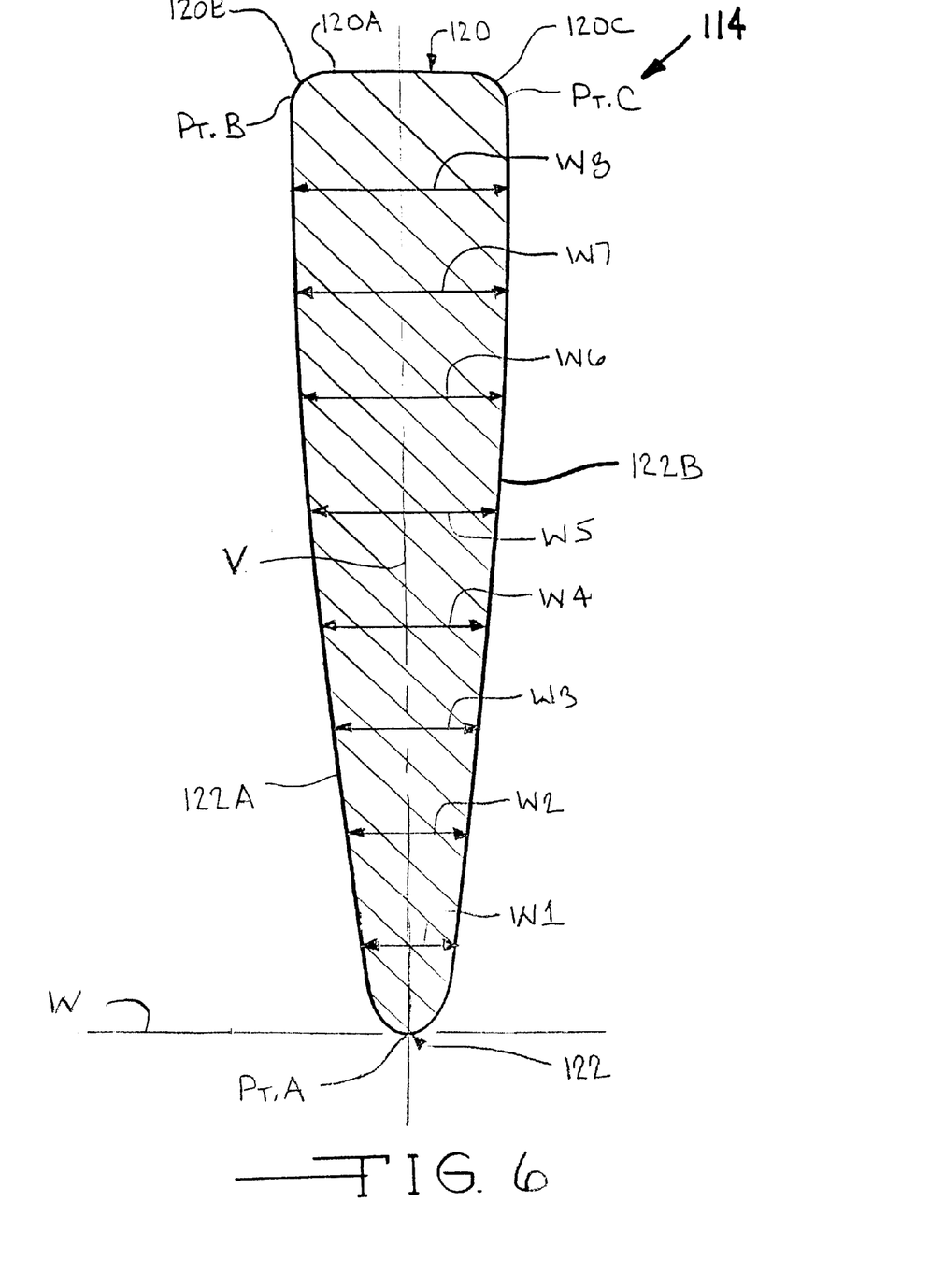
FIG. 6 is an enlarged sectional view of a fin of the brake rotor illustrated in FIGS. 4–5.

Referring now to FIGS. 4 through 6, there is illustrated a first embodiment of an improved structure for a brake rotor, indicated generally at 100, in accordance with the present invention and which can be used in place of the prior art brake rotor 52 of the prior art disc brake assembly 10 illustrated in FIGS. 1 through 3. Although the brake rotor 100 of this invention will be described and illustrated in conjunction with the particular prior art vehicle disc brake assembly 10 disclosed herein, it will be appreciated that it may be used in conjunction with other disc brake assembly structures.

The illustrated brake rotor 100 is a "full cast" rotor and is formed as a one piece casting. The rotor 100 includes an inner mounting flange 102 and an outer annular friction disc 104. The inner mounting flange 102 and the outer friction disc portion 104 are preferably cast from gray iron as one piece by a conventional casting process. However, other materials, such as for example, iron, aluminum, or alloys thereof can also be used. The inner mounting flange 102 is formed having a relatively large center pilot hole 106 which is located generally concentrically about an axis of rotation A for the brake rotor 100. A plurality of smaller lug bolt receiving holes 108 are also formed through the inner mounting flange 102. The lug bolt receiving holes 108 are equally spaced circumferentially about the pilot hole 106. The pilot hole 106 and the lug bolt receiving holes 108 can be formed by a conventional machining operation after the casting operation is completed. A lug bolt (not shown) extends through each of the lug bolt receiving holes 108 for securing the brake rotor 100 to a vehicle wheel (not shown) for rotation therewith in a known manner.

The friction disc 104 includes a pair of annular friction plates 110 and 112 which are connected together in a spaced apart relationship by a plurality of fins or posts, indicated generally at 114 in FIGS. 4 and 6. In the illustrated embodiment, the post 114 are equally spaced circumferentially around the friction disc 104, and each successive pair of fins 114 defines a radially extending cooling passageway 116 between the friction plates 110 and 112 of the brake rotor 100. The specific structure and orientation of the fins 114 will be described in detail below.

The friction plate 110 is connected by a circumferential wall or "hat" 118 to the inner mounting flange 102. The friction plate 110 includes an inner facing surface 10A, an outer facing surface 110B, an inner peripheral edge 110C, and an outer peripheral edge 110D. Similarly, the friction plate 112 includes an inner facing surface 112A, an outer facing surface 112B, an inner peripheral edge 112C, and an outer peripheral edge 112D. The inner facing surfaces 110A and 112A and the outer facing surfaces 110B and 112B of the friction plates 110 and 112, respectively, are located in a generally parallel relationship relative to one another. The outer peripheral edges 110D and 112D of the friction plates 110 and 112, respectively, define an outer brake rotor diameter D relative to the axis of rotation A.

As shown in FIG. 5, the inner facing surface 110A of the friction plate 110 is progressively tapered in a radial direction from the outer peripheral edge 110C to the inner peripheral edge 110D thereof. Similarly, the inner facing surface 112A of the friction plate 112 is progressively tapered in a radial direction from the outer peripheral edge 112C to the inner peripheral edge 112D thereof. As a result of the tapering of the inner facing surfaces 110A and 112A of the friction plates 110 and 112, respectively, the cross-sectional thickness of the friction plates 110 and 112 increases from an original thickness T1 at the inner peripheral ends 110D and 112D, to an increased thickness T2 at the outer peripheral ends 110C and 112C, as shown in FIG. 5. As will be discussed below, the tapering of the friction plates 110 and 112 has a twofold purpose of increasing both the thermal and mechanical properties of the brake rotor 100.

Turning now to FIG. 6, the shape of the fin 114 illustrated in this embodiment will be discussed. As shown therein, the fin 114 extends in a generally radial direction and includes a unique configuration. In particular, each fin 114 includes an innermost end 122 and an outermost end 120. As shown in FIGS. 4 and 5, the innermost end 122 of each fin 114 is spaced outwardly from the inner peripheral ends 110D and 112D of the respective friction plates 110 and 112, and the outermost end 120 of each fin 114 is spaced inwardly from the outer peripheral ends 110C and 112C of the respective friction plates 110 and 112.

In the illustrated embodiment, the fin 114 defines a common or symmetric center axis V between the outermost end 120 and the innermost end 122 thereof. The outermost end 120 of the fin 114 extends between a Point B and a Point C and defines a generally flat outermost surface 120A with slightly rounded corners at opposed ends 120B and 120C thereof. The innermost end 122 of the fin 114 is curved and defines a first smooth curved outer surface 122A extending between a Point A and Point B, and a second smooth curved outer surface 122B extending between Point A and Point C. Thus, as shown in FIG. 6, the fin 114 defines progressive increasing axial widths W1–W8 (only eight of such widths being illustrated for discussion purposes) between the surfaces 122A and 122B starting from the innermost end 122 toward the outermost end 120 thereof.

In order to ensure that the fin 114 has a curved outer surface 122A between Point A to Point B and a curved outer surface 122B between Point A to Point C, the curved outer surfaces 122A and 122B of the fin 114 are defined by the equation $y=k|x|^n$, where y is the radial distance of a point on the outer surfaces 122A and 122B of the fin 114 from an axis W defined by base of the fin 114 designated by Point A in FIG. 6, k is a constant that controls the curvature of the outer surfaces 122A and 122B of the fin 114, x is the distance of a point on the outer surfaces 122A and 122B of the fin 114 from the axis of symmetry, and n is an exponent that controls the degree of curvature of the outer surfaces 122A and 122B of the fin 114. Also, in the equation $y=k|x|^n$, "n" can assume any value, either integer or fractional. The advantage of this type of functional relationship is that the curve that defines the outer surfaces 122A and 122B of the fin 114 is continuous along substantially its entire path, and its derivatives are also continuous. As a result, improved heat transfer of the fin 114 is achieved.

Figure 7:
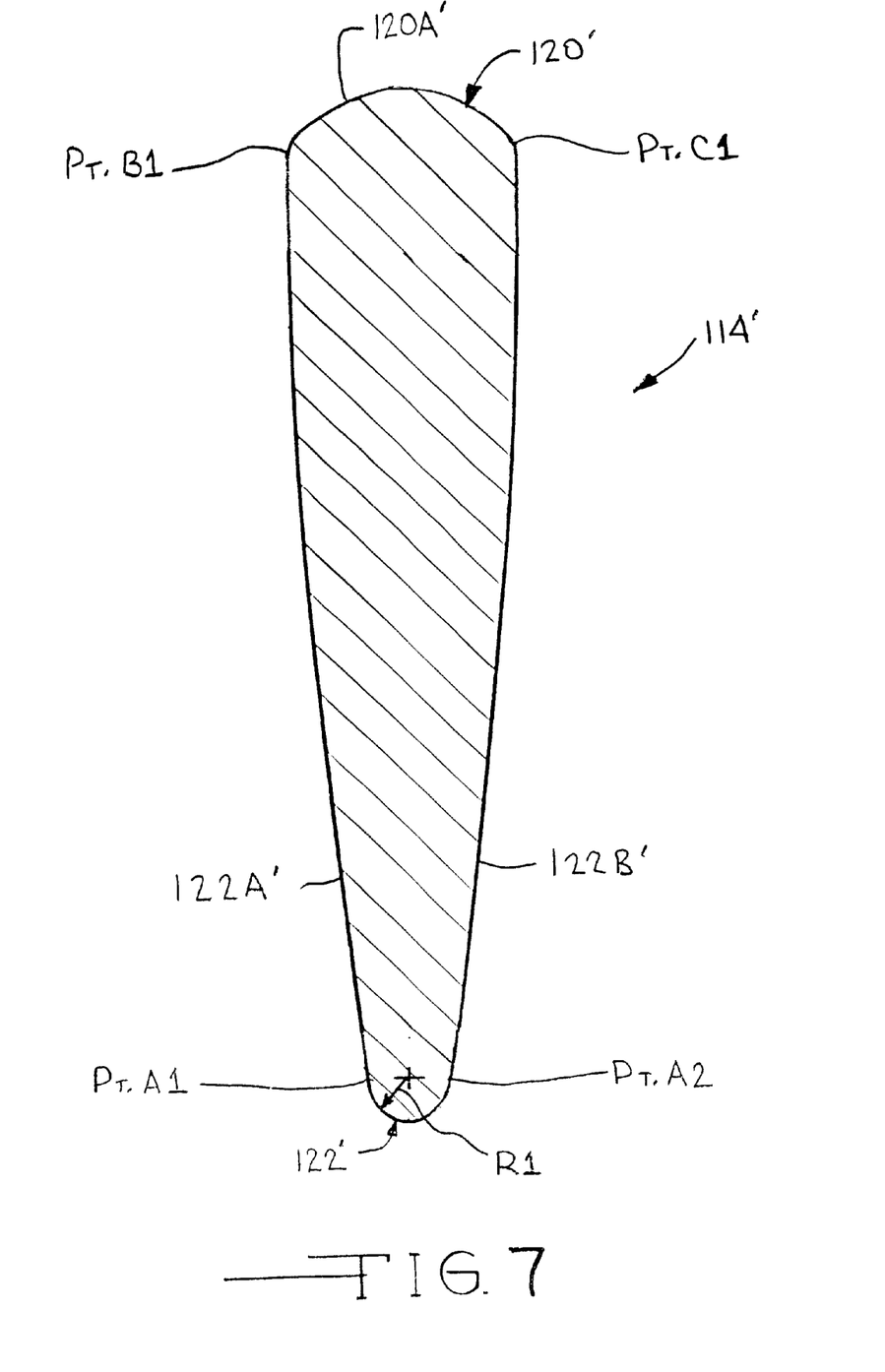
FIG. 7 is an enlarged sectional view of a second embodiment of a fin for use in a brake rotor in accordance with the present invention.

Alternatively, the profile of the outermost end 120 of the fin 114 and/or the profile of the innermost end 122 of the fin 114 can be other than illustrated if so desired. For example, in the embodiment illustrated in FIG. 7, a fin 114' includes an outermost end 120' having a curved or rounded outer surface 120A' and an innermost end 122' having a rounded surface defined by a radius R1. Also, as shown in FIG. 7, the curved outer surfaces 122A' and 122B' of the fin 114' do not start at a common point (i.e., Point A in FIG. 6), but rather start adjacent to the innermost end 122' of the fin 114' and extend from Point A1 to Point B1 and from Point A1 to Point C1. However, it is preferred that the fin 114 and 114' have a continuous curved outer surface 122A and 122B and 122A' and 122B' starting at or near the innermost end 122 and 122' and extending outwardly toward the outermost end 120 and 120'. Also, is it preferred that the innermost end 122 and 122' of the fin 114 and 114' have a profile which does not inhibit or interfere with the flow of cooling air from the inner diameter of the rotor through the cooling passageways and out through the outer diameter of the brake rotor.

Figure 8:
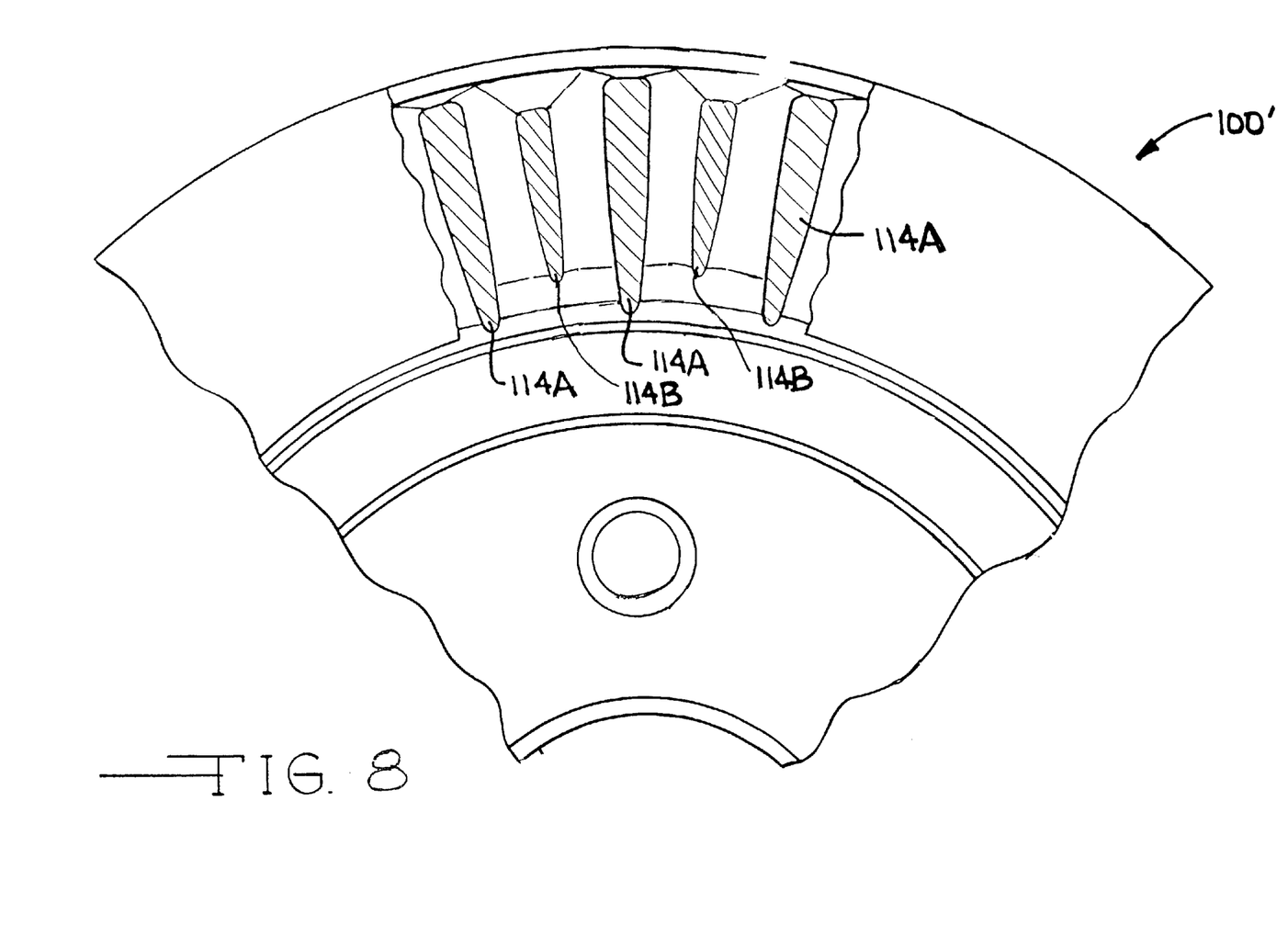
FIG. 8 is a sectional view, partially broken away, of a portion a third embodiment of an improved structure for a brake rotor adapted for use in the prior art disc brake assembly illustrated in FIGS. 1–3, in accordance with the present invention.

Referring now to FIG. 8 and using like reference numbers, there is illustrated a third embodiment of a brake rotor, indicated generally at 100' in accordance with the present invention. As shown therein, the brake rotor 100' includes a first plurality of fins 114A and a second plurality of fins 114B which are similar in shape to the fins 114A but smaller. Alternatively, the shape and/or the number of the second fins 114B could be different from the shape of the first fins 114A if so desired.

While the brake rotor 100 and 100' of the present invention has been illustrated and described as being a full cast rotor, the invention may be used in connection with other types of rotors. For example, the invention may be used in connection with a "uni-cast" rotor (not shown), wherein the rotor includes an integral hub portion, or in connection with a "composite" rotor (not shown), wherein the rotor includes a stamped hat portion and a cast outer disc portion. Also, while the rotor 100 of the present invention has been illustrated and described in connection with a "sliding" caliper type of disc brake assembly, the invention may be used with other disc brake assemblies. For example, the invention may be used in connection with a "fixed" caliper type of disc brake assembly (not shown).

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A brake rotor adapted for use in a disc brake assembly comprising:

a brake rotor including an inner mounting flange and an outer annular friction disc connected together by a circumferential hat, said inner mounting flange formed having a center pilot hole and a plurality of lug bolt receiving holes equally spaced circumferentially about said pilot hole, said outer annular friction disc including a pair of annular friction plates which are connected together in a spaced apart relationship by a plurality of fins spaced circumferentially around said friction disc, each successive pair of said fins defines a cooling passageway between said friction plates, each of said fins extending in a generally radial direction and including an innermost end, an outermost end, and a pair of spaced apart outer side wall surfaces, said fin defining a symmetric center axis between said outermost end and said innermost end thereof, said pair of spaced apart outer side wall surfaces defining smooth progressively increasing continuously curved outer surfaces extending radially outwardly from adjacent said innermost end to adjacent said outermost end thereof.

2. The brake rotor according to claim 1 wherein said innermost end of each of said fins is spaced outwardly from an inner peripheral end of said friction plates, and said outermost end of each of said fins is spaced inwardly from an outer peripheral end of said friction plates.

3. The brake rotor according to claim 1 wherein each of said friction plates include an inner facing surface which is progressively tapered in a radial direction from an outer peripheral edge to an inner peripheral edge thereof so as to define a first cross-sectional thickness of said friction plates at said inner peripheral ends and a second cross-sectional thickness of said friction plates at said outer peripheral ends which is greater than said first cross-sectional thickness.

4. The brake rotor according to claim 1 wherein said outermost end of said fin is a generally flat outer surface and said innermost end of said fin is a curved outer surface.

5. The brake rotor according to claim 1 wherein said outermost end of said fin is a curved outer surface and said innermost end of said fin is a curved outer surface.

6. The brake rotor according to claim 1 wherein said outermost surface of said fin is a generally flat outer surface and said innermost end of said is defined by a radius.

7. The brake rotor according to claim 1 wherein said plurality of fins includes at least a first plurality of fins and a second plurality of fins which are different from said first plurality of fins.

8. A brake rotor comprising:

a brake rotor including an outer annular friction disc, said outer annular friction disc including a pair of annular friction plates which are connected together in a spaced apart relationship by a plurality of fins spaced circumferentially around said friction disc, each of said fins extending in a generally radial direction and including an innermost end, an outermost end, and a pair of spaced apart outer side wall surfaces, said fin defining a symmetric center axis between said outermost end and said innermost end thereof, said pair of spaced apart outer side wall surfaces defining smooth progressively increasing continuously curved outer surfaces extending radially outwardly from adjacent said innermost end to adjacent said outermost end thereof.

9. The brake rotor according to claim 8 wherein each of said friction plates include an inner facing surface which is progressively tapered in a radial direction from an outer peripheral edge to an inner peripheral edge thereof so as to define a first cross-sectional thickness of said friction plates at said inner peripheral ends and a second cross-sectional thickness of said friction plates at said outer peripheral ends which is greater than said first cross-sectional thickness.

10. The brake rotor according to claim 8 wherein said innermost end of each of said fins is spaced outwardly from an inner peripheral end of said friction plates, and said outermost end of each of said fins is spaced inwardly from an outer peripheral end of said friction plates.

11. The brake rotor according to claim 8 wherein said outermost end of said fin is a generally flat outer surface and said innermost end of said fin is a curved outer surface.

12. The brake rotor according to claim 8 wherein said outermost end of said fin is a curved outer surface and said innermost end of said fin is a curved outer surface.

13. The brake rotor according to claim 8 wherein said outermost surface of said fin is a generally flat outer surface and said innermost end of said is defined by a radius.

14. The brake rotor according to claim 8 wherein said plurality of fins includes at least a first plurality of fins and a second plurality of fins which are different from said first plurality of fins.

* * * * *